Feb. 17, 1959 P. A. GILOVICH 2,873,725
POSITIONING DEVICE
Filed May 8, 1958 2 Sheets-Sheet 1
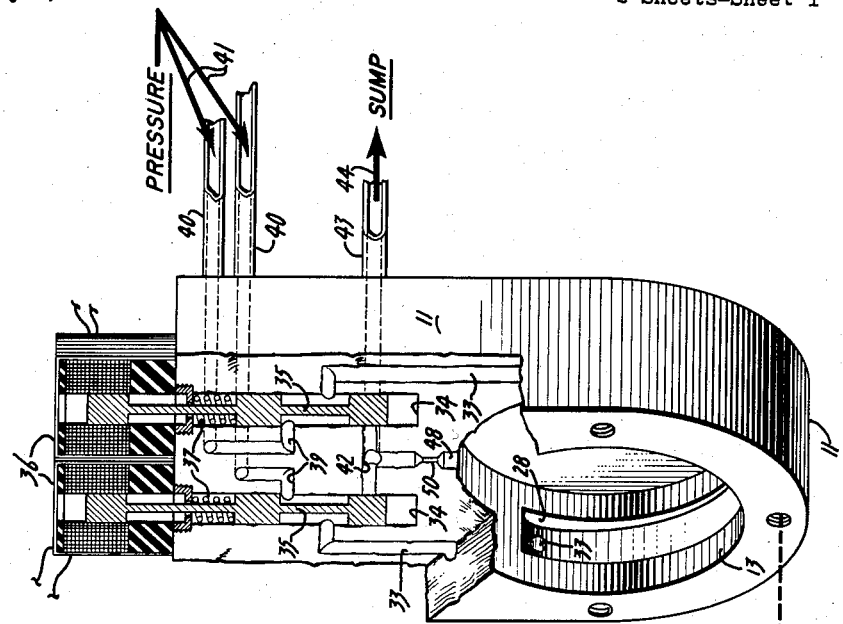
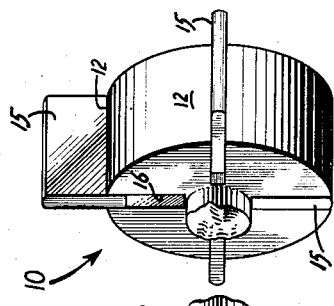
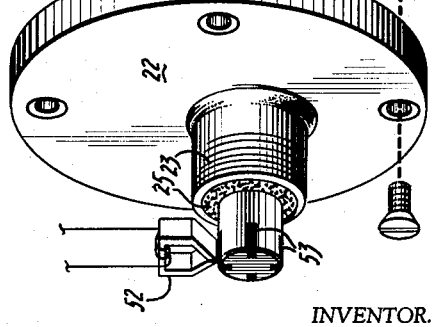
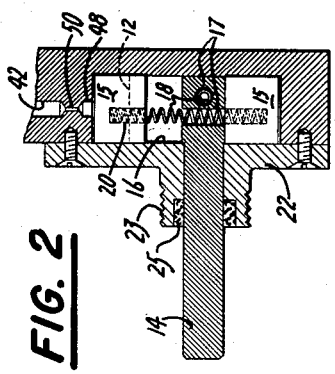
INVENTOR.
PAUL A. GILOVICH
BY
*John B. Sponsler*
AGENT Feb. 17, 1959

P. A. GILOVICH 2,873,725

POSITIONING DEVICE

Filed May 8, 1958

United States Patent Office
2,873,725
Patented Feb. 17, 1959

2,873,725

POSITIONING DEVICE

Paul A. Gilovich, Santa Clara County, Calif., assignor to International Business Machines Corporation, New York, N. Y., a corporation of New York Application May 8, 1958, Serial No. 733,902

15 Claims. (Cl. 121—86)

This invention relates to a fluid driven motor. More particularly, it relates to such a motor having means for arresting its output shaft at a discrete radial position. Hence, this invention is primarily used as a discrete positioning device.

In general, discrete positioning devices must have the ability to locate a driven object precisely at predetermined positions. In some mechanical positioning devices detents have been used for this purpose which fall or lock into place in a notch or socket in an associated driven member and in this manner arrest the movement of the driven member at the exact location defined by the detent. In the hydraulic art, this discrete positioning function is satisfactorily performed by the so-called "port sensing piston," which may be briefly described as a cylinder employing a piston therein which has equal forces applied to its two end faces until one of a series of low pressure exhaust ports in the cylinder is opened on one side of the piston thereby reducing the pressure on that particular side of the piston. This pressure drop causes the piston to move toward the opened exhaust port, i. e., the piston is caused to seek or "sense" the low pressure port. The maximum displacement, however, of such a piston is limited to the longitudinal distance between the extreme exhaust port locations. Consequently, unless gears, for example, are used to multiply the output displacement, the ratio of output displacement to input displacement is objectionably high. An output displacement of one foot, for example, requires an actuating mechanism wherein the extreme exhaust port locations are also one foot apart. In general, the use of gearing in positioning devices to increase the ratio of the "throw" of the output member with respect to the total displacement of the input member, i. e., the distance of travel of the piston between the extreme exhaust port locations, is highly undesirable for the reason that accuracy is lost in the back-lash and slack inherent in all but the most expensive gearing arrangements. Therefore, although port sensing pistons provide excellent precision positioning, as will be explained more fully below, the length of the actuating mechanism is relatively large compared to the "throw" achieved and for this reason their use has been somewhat restricted to machines wherein their bulk is not objectionable.

Therefore, it is an object of this invention to provide a port sensing positioning device which eliminates the inordinately high ratio of output "throw" to input displacement usually found in port sensing pistons, without employing a mechanical gear train for the purpose.

A feature of port sensing pistons which is highly desirable in positioning applications is that they can be easily made to be "self-detenting" and hence very accurate. This may be done by merely narrowing the piston with respect to the exhaust port which defines each discrete position, so that the periphery of the piston can never completely cover these ports. Thus, when pressurized fluid entering from the ends of the cylinder is applied equally to both faces of the piston and one of the exhaust ports is open, the piston will move to the discrete position defined by the open port. However, since the periphery of the piston can never close off the exhaust port completely, the pressurized fluid entering the cylinder will escape from the cylinder equally from both sides of the piston via the exposed port area on each side of the piston. In this manner, the piston will center itself on the opened port. This relationship of piston to port is generally described as one of "negative overlap" and provides quite precise positioning competitive with mechanical detening using pawls, latches, or dogs, etc.

In the air motor art, as exemplified by U. S. Letters Patent 671,936, an infinite rotary displacement is achieved by supplying air under pressure on one side of a vaned rotor while exhausting the air from the other side. The rotor will continue to run as long as this condition exists. Closing the air supply will cause the rotor to coast to a stop, and a reversal of the air supply will reverse the direction of rotation of the rotor. In order to more rapidly arrest the rotor, friction brakes have been employed which operate when the driving air is shut off. See for example U. S. Letters Patent 2,243,656 and U. S. Letters Patent 2,778,344. Inherent in such a friction brake arrangement is a certain amount of slippage so that the precise angular stopping position of the rotor shaft cannot be accurately predicted. Thus, if such a motor were used in a positioning application, the timing of the actuation of the brake would be extremely critical to prevent any "overshoot" of the shaft's rotation beyond its destination. In short, if the brake lets the shaft skid past the selected stopping place, there is no way to reverse the shaft except by reversing the driving air supply. If such reversal of the air supply still fails to place the shaft at its correct angular location, more reversals become necessary. Thus, in precise positioning applications, where accuracy of a high order is demanded, the "hunting" inherent in a friction brake attachment to an air motor would be undesirable and make its use for such purposes objectionable, even though the air motor per se has the advantage of an infinite rotary displacement. However, in the present invention the principle of port sensing has been applied to a fluid motor to provide a positioning device of considerable accuracy.

Accordingly, the present invention combines the advantage of infinite output displacement as found in the air motor with the precise positioning feature of the port sensing piston, while at the same time avoiding the limitations of each as described above. Therefore, it is an object of this invention to provide a positioning device of the port sensing piston type wherein an infinite output displacement is achieved.

Conventional port sensing pistons require a plurality of exhaust ports, i. e., one for each discrete position, as noted above, which are usually controlled by valves, such as poppet valves. However, according to the present invention, only a single exhaust port is required, and this single exhaust port need not employ any control valve at all. Thus, a substantial simplification with attendant economy has been effected. Therefore, it is another object of this invention to provide a simplified port sensing piston.

Other objects of the invention will be pointed out in the following description and claims and illustrated in the accompanying drawings which disclose, by way of example, the principle of the invention and the best mode which has been contemplated of applying that principle.

In the drawings:

Fig. 1 shows an exploded perspective view of the invention.

Fig. 2 is a proportionately reduced sectional view of a portion of the invention of Fig. 1 in its assembled condition, showing the arrangement for outwardly biasing the rotor vanes of the device.

Figure 4:
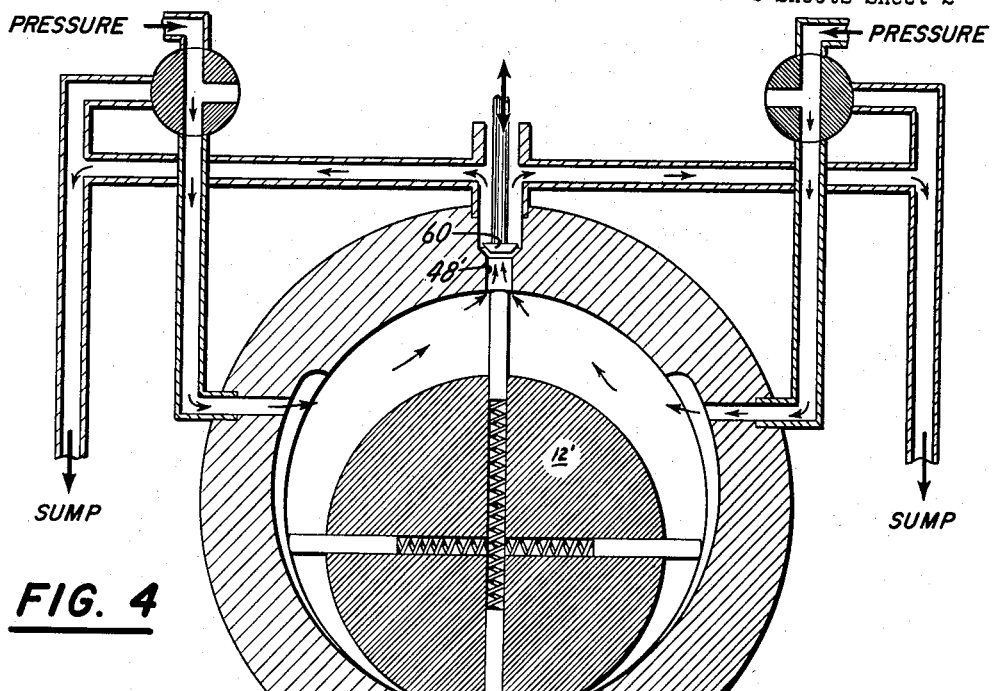
Fig. 4 is a schematic representation similar to Fig. 3 showing a second embodiment thereof.

Briefly stated, this invention applies the principles of port sensing to accurately arrest the rotor shaft of a fluid motor by employing an exhaust port positioned intermediate a pair of driving ports which are arranged to either supply or exhaust fluid from the rotor housing to control its direction. Thus, the rotor is arrested by supplying fluid under pressure to the rotor housing via both driving ports while opening the intermediate port to exhaust the fluid supplied. This causes the vane of the rotor which is nearest the exhaust port to "sense" the exhaust port thereby stopping the rotor shaft.

Referring to the drawings and particularly to Fig. 1, there is provided a housing 11 having a rotor assembly 10 eccentrically positioned therein in a cylinder bore 13. Assembly 10 is comprised of a hub 12 mounted on and adapted for rotation with shaft 14. Hub 12 is provided with four vanes 15 slidably arranged in slots 16. Vanes 15 are continuously urged outwardly against the wall of bore 13 by springs 18 (Fig. 2) recessed in drilled holes 20 in vanes 15. Springs 18 extend through drilled holes 17 in shaft 14. Shaft 14 is journaled in a cover plate 22 and a boss 23 thereon, which holds a suitable packing 25. With assembly 10 assembled in bore 13 of housing 11, it is free to rotate in either direction.

For driving assembly 10, there has been provided a pair of elongated tapered ports 28 in bore 13, only one of which is visible in Fig. 1. Each of ports 28 is arranged to be selectively connected either to a pressure supply source or to sump or exhaust by a 3-way spool valve 35. The appropriate connections for each of ports 28 are achieved by channels 33 formed in housing 11 leading from ports 28 to the manifolds 34 of valves 35. Valves 35 are both actuated upwardly by associated solenoids 36 acting against the downward bias of springs 37. This condition is shown in Figs. 1, 3 and 4 wherein both valves 35 are actuated to pressure.

The upper portion of each manifold 34 is ported via a channel 39 and hose 40 to a single pressure source, or two sources of equal pressure, represented by arrows 41. The lower portion of each manifold 34 is channeled via a T connection 42 in housing 11 and a hose 43 connected thereto which leads to a sump (not shown) represented by arrow 44. The spools of valves 35 are spaced so that channels 33 may be connected either to pressure or to exhaust depending upon the condition of their associated controlling solenoids 36. Thus, energizing one of the solenoids 36 (as shown in Fig. 1) will supply fluid under pressure to bore 13 from pressure source 41 via hose 40, channel 39, manifold 34, channel 33 and port 28. Conversely, de-energizing one of the solenoids 36 permits spring 37 to so position the spools of valves 35 so that port 28 is connected to sump 44, via channel 33, manifold 34, T connection 42 and hose 43. With the arrangement as described thus far it is possible to drive shaft 14 in either direction by opening one of ports 28 to pressure and the other port 28 to exhaust.

Located between ports 28 in housing 11 is a control port 48 which connects bore 13 to T connection 42 through an orifice 50. Port 48 is preferably wider than the thickness of vanes 15 to provide some "negative overlap" therewith.

Figure 3:
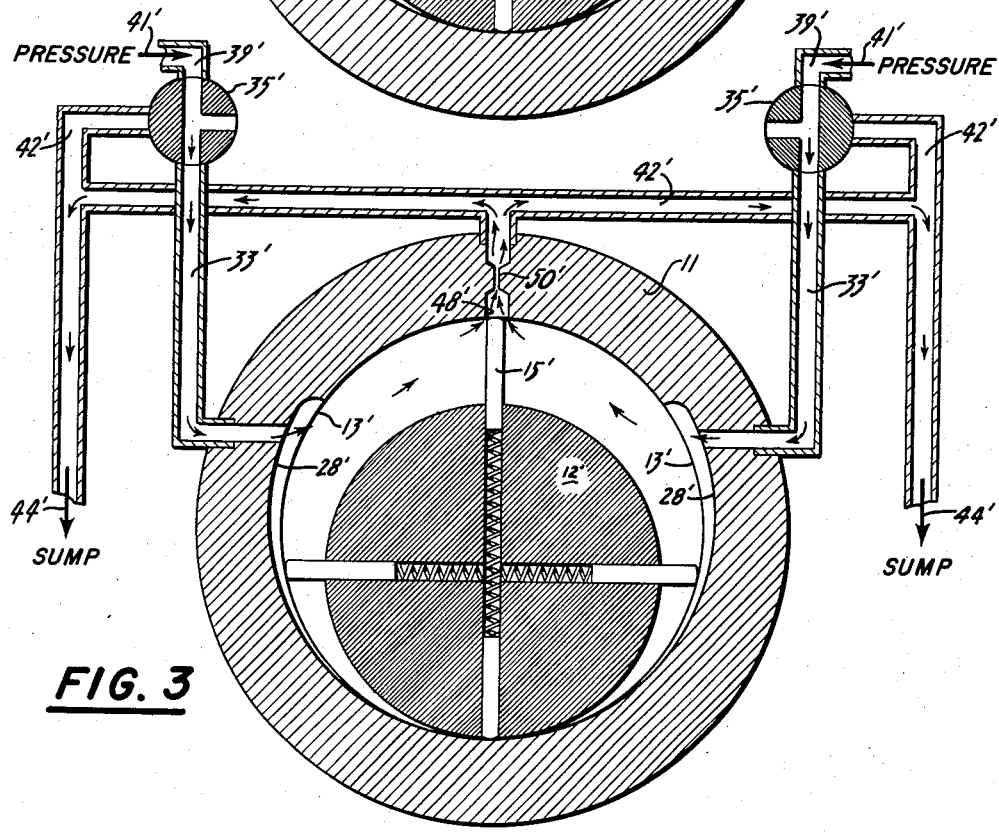
Fig. 3 is a schematic representation of the invention of Fig. 1.

The operation of this invention is best shown in Fig. 3 wherein a schematic representation of Fig. 1 is shown. The structural parts of the apparatus of Fig. 1 are represented schematically in Fig. 3 and identified by corresponding primed reference numbers. If it is desired to drive hub 12' in a clockwise direction, the left-hand spool valve 35' is conditioned (as shown in Fig. 3) to admit pressurized fluid from source 41' to bore 13', while at the same time the right-hand valve 35' is conditioned to exhaust fluid to sump 44'. In Fig. 3, this would be done by rotating the right-hand valve 35' counter-clockwise 90° from its position as shown. In this condition, some minimal amount of fluid will also pass to sump via orifice 50'. The amount of fluid so passing via orifice 50' is, of course, governed by its size relative to the size of channels 33'. The greater this ratio becomes, the greater will be the orifice flow. Increased orifice flow reduces the driving thrust applied to vanes 15' of assembly 10, thereby reducing its acceleration. Therefore, various ratios may be selected dependent upon the degree of acceleration desired. In short, orifice 50' should, to some extent, resist the flow of fluid from bore 13' in order to drive vanes 15' over to channel 33' when open to exhaust. In this sense, then, orifice 50' may be described as a "restrictive" orifice.

When it is desired to stop hub 12', both of valves 35' are conditioned (as shown in Figs. 1, 3 and 4) to supply fluid under pressure to bore 13' thereby causing all fluid entering bore 13' to leave via control port 48' and orifice 50'. With vanes 15' being narrower than the width of port 48', fluid will exhaust equally from both sides thereof thereby "detenting" a vane 15'. The "detented" vane 15' will be the one which is nearest port 48' at the time both valves 35' are conditioned to pressure. It is to be understood that vanes 15' may be exactly the width of port 48' or even wider without departing from the invention; however, if vanes 15' completely cover port 48' the system pressure will rise considerably above that which it uses in the preferred "negative overlap" embodiment described and shown above.

To control solenoids 36 so as to arrest hub 12 at a selected quarter revolution, suitable well known means may be provided, such as schematically shown in Fig. 1. There shown is a "ring" type magnetic transducer 52 which is arranged to sense magnetic segments 53 embedded in shaft 14. Transducer 52 is connected to suitable electronic counting and control circuitry (not shown) for instructing solenoids 36 as to the proper time to arrest shaft 14. It is to be understood that the means for indicating the appropriate moment of arresting shaft 14 is not part of the invention herein since suitable arrangements will immediately suggest themselves to those skilled in the art.

Referring now to Fig. 4 another embodiment of the invention is there shown wherein a valve 60 is employed to control port 48. This embodiment has the advantage of imparting an even greater acceleration to hub 12' than in the previous embodiment. The operation of the embodiment in Fig. 4 is similar to that shown in Fig. 3; however, when both of valves 35' are open to pressure, hub 12' begins coasting to a stop and positive stopping of hub 12' is not immediately effective until valve 60 is opened. Opening valve 60, however, positively and abruptly stops the rotation of hub 12'. In this manner, a certain controlled deceleration of shaft 14 may be effected. It will, of course, be obvious to those skilled in the art that other variations in the sequence and timing of the operation of the driving and control valves, as well as variations in the type of valve 60 employed, will produce additional desirable operating characteristics. Further, use of incompressible liquids rather than air or other gases is preferred since a more positive control of shaft and rotor is thereby obtained, although it will be obvious to the skilled technician that the invention will work on any fluid.

While there have been shown and described and pointed out the fundamental novel features of the invention as applied to the preferred embodiment, it will be understood that various omissions and substitutions and changes in the form and details of the device illustrated and in the operation may be made by those skilled in the art, without departing from the spirit of the invention. It is the intention, therefore, to be limited only as indicated by the scope of the following claims.

What is claimed is:

1. A positioning device comprising a first member, a second member, a plurality of vanes supported by one of said members for continuous rotation with respect to the other of said members, and means for passing fluid from a first pressure source to a lower pressure source from opposite sides of one of said vanes to arrest said one of said vanes.

2. A positioning device comprising a first member, a second member, a plurality of vanes supported by one of said members for continuous rotation with respect to the other of said members, a first fluid pressure source, a second fluid pressure source, said second source pressure being less than said first source pressure, and means for passing fluid from said first pressure source to said second pressure source from opposite sides of one of said vanes to arrest said one of said vanes.

3. A positioning device comprising a housing, a member mounted for continuous rotation within said housing, said member having a plurality of vanes, means for applying fluid under pressure to opposite sides of at least one of said vanes, and means for exhausting said fluid from said housing to position the said vane.

4. A positioning device comprising a cylinder closed at each end, a rotor mounted for continuous rotation within said cylinder, said rotor having a plurality of vanes extending outwardly therefrom, means for driving said rotor, means for applying fluid under substantially equal pressure to opposite sides of at least one of said vanes, and means for venting said fluid from said cylinder to arrest said one of said vanes.

5. In a positioning device having a cylinder closed at each end, and a rotor mounted within said cylinder, a rotor control means comprising in combination a plurality of vanes extending from said rotor, means for providing a fluid pressure differential across one of said vanes to rotate said rotor, and means for cancelling said pressure differential to arrest said rotor at a predetermined discrete position thereof.

6. In a positioning device having a cylinder closed at each end, and a rotor mounted within said cylinder, a rotor control means comprising in combination a plurality of vanes extending from said rotor, means for providing a fluid pressure differential across one of said vanes to rotate said rotor, and means for cancelling said pressure differential to arrest said rotor at a predetermined discrete position thereof, said pressure cancellation means including a port in said cylinder for venting said cylinder to a reduced pressure from opposite sides of said one of said vanes.

7. A positioning device comprising a cylinder closed at each end, a rotor within said cylinder, said rotor including a plurality of vanes extending outwardly therefrom, said vanes being arranged to follow the inner contour of the cylinder during rotation of said rotor, means for providing a fluid pressure differential across one of said vanes to drive said rotor, and means for arresting said rotor, said arresting means including an exhaust port in the wall of said cylinder, and means for discharging fluid from said cylinder via said exhaust port from opposite sides of one of said vanes to arrest said one of said vanes at a predetermined discrete radial position thereof.

8. A positioning device comprising a cylinder closed at each end, a rotor within said cylinder, said rotor including a plurality of vanes extending outwardly therefrom, said vanes being arranged to follow the inner contour of the cylinder during rotation of said rotor, means for providing a fluid pressure differential across one of said vanes to drive said rotor, and means for arresting said rotor, said arresting means including an exhaust port in the wall of said cylinder, and means for discharging fluid from said cylinder via said exhaust port simultaneously from opposite sides of one of said vanes to arrest said one of said vanes at a predetermined discrete radial position thereof.

9. A positioning device comprising a cylinder closed at each end, an exhaust port in the wall of said cylinder, a rotor within said cylinder, said rotor comprising a hub and a plurality of vanes extending outwardly therefrom, said vanes being arranged to follow the inner contour of the cylinder wall as said hub is rotated, means for supplying fluid under pressure to said cylinder from both sides of said exhaust port simultaneously to position one of said vanes at said port, and means for reducing said pressure on one side of said port to move said rotor in the direction of said reduced pressure.

10. The invention of claim 9 wherein said exhaust port comprises a restrictive orifice.

11. The invention of claim 9 wherein said vanes are constructed to partially cover said exhaust port.

12. A positioning device comprising a cylinder closed at each end, a rotor mounted for rotation within said cylinder, said rotor having a plurality of vanes extending therefrom, said vanes being arranged to follow the inner wall of said cylinder, means for driving said rotor, means for applying fluid under substantially equal pressure to opposite sides of one of said vanes, and means for venting said fluid from said cylinder to position said one of said vanes at said venting means.

13. A positioning device comprising a cylinder closed at each end, a rotor mounted for rotation within said cylinder, said rotor having a plurality of vanes extending therefrom, said vanes being arranged to follow the inner wall of said cylinder, means for applying a pressure differential across said vanes to drive said rotor, means for applying fluid under substantially equal pressure to opposite sides of one of said vanes, and means for venting said fluid from said cylinder to position said one of said vanes at said venting means.

14. The invention of claim 12 wherein said venting means comprises a restrictive orifice.

15. The invention of claim 12 wherein said venting means comprises an exhaust port in said cylinder and means for controlling said exhaust port.

No references cited.